April 27, 1965  M. FERRAND  3,180,055

SEEDLING PROPAGATING DEVICE

Filed Dec. 10, 1962

INVENTOR
MARCEL FERRAND
BY W.A. DRUCKER
ATTORNEY

United States Patent Office 3,180,055
Patented Apr. 27, 1965

3,180,055
SEEDLING PROPAGATING DEVICE
Marcel Ferrand, 13 Rue Oswald, Larroque,
Toulon, Var, France
Filed Dec. 10, 1962, Ser. No. 243,261
Claims priority, application France, Dec. 12, 1961,
19,559, Patent 1,307,813
4 Claims. (Cl. 47—37)

Experience has shown that the roots of plants make quicker progress when in contact with smooth, moist walls than when they are inside porous surfaces.

It is thus possible to accelerate the growth of plants, taking steps to further their development from the seed-stage onwards.

The object of the invention is to provide a cylindrical device inside which the plant is placed with mould or earth and with certain quantities of expanded material or vermiculite, the entire system enabling the plant to be transferred from the greenhouse to the open ground without any interruption of vegetation.

It is characterized by the means employed, considered both in conjunction with one another and independently of one another, and more particularly by a tubular element, open at each end and having a star-shaped cross section and longitudinal bends, the rolled upper edge forming a receptacle and a securing-means to enable them to be stabilized at a certain height, so that their opposite extremities can be submerged in a container. These tubes, preferably transparent, render it easier to watch the progress of the roots. After germination, the transfer of the plant just as it is to the open ground enables the roots to be caused to penetrate into the deep layers in soil which have not been exhausted and which are out of reach of the insects and parasites to be found near the surface.

Figure 1:
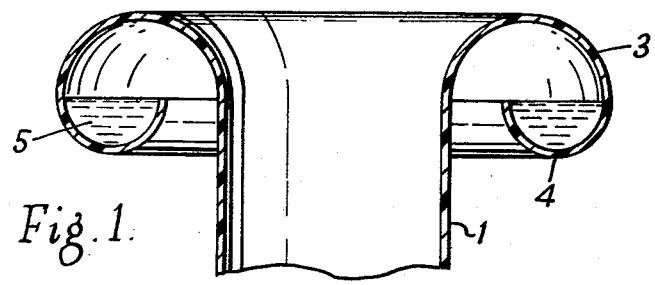
Figure 2:
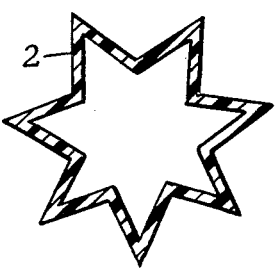
Figure 3:
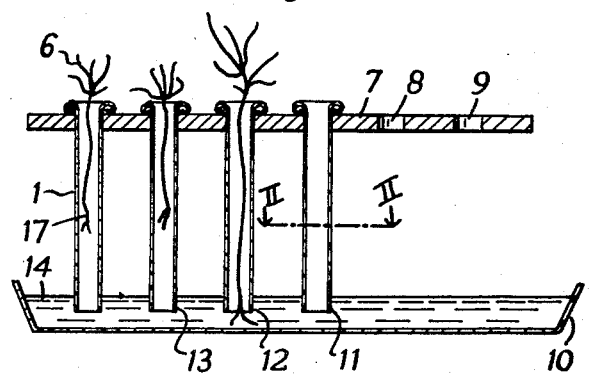
Figure 4:
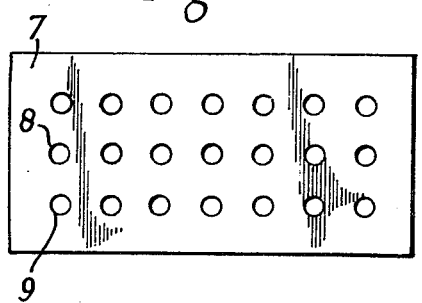
Figure 5:
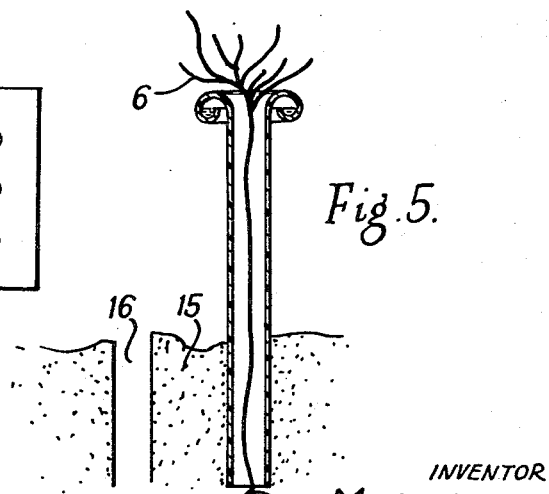

In the accompanying drawings which illustrate by way of an example without any limitative effect one possible constructional version of the device to which the invention relates:

FIGURE 1 shows the upper part of the tube, in longitudinal section; FIG. 2 shows a cross section through the tube, taken on the line II—II of FIG. 5; FIG. 3 shows how the tubes are arranged in series, on a frame; FIG. 4 is a plan view of part of the upper surface of the frame; FIG. 5 shows how the tubes are used for placing the plants in the open ground.

The tube in FIGS. 1 and 2 consists of a tubular element 1 with a star-shaped cross section and with longitudinal folds 2.

The upper part of the element has a rolled edge 3 which, by means of the lower bend 4, forms a circular container 5.

The length and diameter of this tube are suitable for the seedling 6, and it is intended to be placed on a frame 7 provided with a series of perforations 8 and 9 and situated at a certain height above a container 10 so that the bases 11, 12 and 13 can be immersed in the water 14.

These same tubes are placed in the open ground 15, in the holes 16 made in advance, so that the roots 17 can spread in the ground.

The advantages of this device are numerous.

At the seedling stage, as shown in FIG. 3, the seed is placed in soil at the top of the element 1 so that the stalk can emerge and the root develop in the opposite direction.

The tube, being filled with mould and with compressible absorbent material, conveys the water from the container 10 into the entire mass, and germination rapidly occurs. As the tube is transparent, it is possible to observe the growth of the root. Watering is dispensed with during the greenhouse period, and the star-shaped cross section increases aeration owing to the increase in the surface-area, at the same time enabling the diameter to be increased in the course of growth.

The rolled edge 3 constitutes a container 5, protected from outside agents, and it may contain an anti-parasite product or the like. The edge also prevents insects from ascending and protects the stem from rodents.

Furthermore, the roots are guided to the desired depth, as shown in FIG. 5, where they are supplied with the required moisture, thus rendering frequent watering unnecessary, and at the same time enabling them to develop in a fertile subsoil which has not been exhausted like the soil near the surface.

The planting-out operations are simplified, since all that is necessary is to prepare the holes 16 with a planting-tool of some kind, the tubes 1 then being sunk into them.

The part of the plant above surface-level is not in contact with the earth and is thus protected from attack by cryptogams and other parasites, the mould contained in the tube having been sterilised in advance.

Finally, the transplanting-operation, in which the plant taken out of the earth invariably suffers and takes a considerable time to re-adapt itself, no longer entails any delay. Vegetation continues uninterrupted and within a reduced period.

The filling of the tube with compressible elements and the possibility of moving the walls 2 apart to allow room for the plant to grow by expansion of the container obviates any interruption in the growth of the plant.

The thickness is such that when the stem becomes larger the expansion cushioned by the folds takes place without strain and without damage to the plant.

In most cases, these tubes can be recovered and re-utilized, cultivation thus being speeded up. They enable plants to develop in impoverished soils, owing to penetration into depths which have not yet been exhausted.

The shapes, dimensions and arrangements adopted for the various elements may nevertheless vary within the limits allowed by equivalence, as may also the materials used for their manufacture, without thereby departing from the general principle of the invention described in the foregoing.

I claim:

1. A device for use in the propagation and growth of a plant seedling comprising a soil filled tubular body the wall of which has a plurality of similar plane longitudinal pleated folds and which is star-shaped in transverse pleated section.

2. An article of manufacture for the propagation and growth of plant seedling comprising a tubular body the wall of which has a plurality of longitudinal pleated folds and which is star-shaped in transverse cross section and which at one end is formed as an external trough, and a filling in said tubular body of soil and porous material.

3. Apparatus for supporting plant seedlings during propagation and growth comprising a water container, an apertured support disposed horizontally and at a spacing above the container, and a plurality of seedling-holding devices each consisting of a plant growth material filled tubular body the wall of each of which has a plurality of longitudinal pleated folds and which is star-shaped in transverse cross section, said seed holding devices being disposed in the apertures of the support with the bottom end of the tubular wall in the water.

4. An article according to claim 2 in which one end is rolled over externally through more than 180 degrees so as to constitute said trough.

References Cited by the Examiner

UNITED STATES PATENTS

| Re. 21,820 | 6/41 | Munsell | 47—1.2 |
| 1,959,139 | 5/34 | Otwell | 47—37 |

FOREIGN PATENTS

| 565,392 | 3/58 | Belgium. |
| 619,085 | 9/35 | Germany. |
| 115,523 | 12/36 | Hungary. |

T. GRAHAM CRAVER, *Primary Examiner.*